US012403490B1

(12) United States Patent
Pejovic

(10) Patent No.: US 12,403,490 B1
(45) Date of Patent: Sep. 2, 2025

(54) POWDER COATING NOZZLE

(71) Applicant: Ivan Pejovic, Tyler, TX (US)

(72) Inventor: Ivan Pejovic, Tyler, TX (US)

( * ) Notice: Subject to any disclaimer, the term of this patent is extended or adjusted under 35 U.S.C. 154(b) by 87 days.

(21) Appl. No.: 18/388,771

(22) Filed: Nov. 10, 2023

(51) Int. Cl.
*B05B 5/035* (2006.01)
*B05B 5/047* (2006.01)

(52) U.S. Cl.
CPC .............. *B05B 5/035* (2013.01); *B05B 5/047* (2013.01)

(58) Field of Classification Search
CPC ......... B05B 1/14; B05B 1/3405; B05B 5/035; B05B 5/0418; B05B 5/047
USPC .......................... 239/589, 597–599, 601, 696
See application file for complete search history.

(56) References Cited

U.S. PATENT DOCUMENTS 2,663,591 A * 12/1953 Pew .......................... B05B 1/14 239/602
3,730,438 A * 5/1973 Howe ....................... B05B 1/14 239/490
3,870,232 A * 3/1975 Lacchia ................ B05B 7/1486 137/890
4,399,945 A * 8/1983 Ruud ...................... B05B 5/047 239/697
5,368,237 A 11/1994 Fulkerson
5,711,489 A * 1/1998 Yanagida ................ B05B 5/047 239/105
6,892,962 B2 * 5/2005 Hurley .................... F23D 11/04 239/405
7,160,391 B2 * 1/2007 Willey .................... B05B 5/025 118/313
2002/0063176 A1 * 5/2002 Leuteritz ................ F23D 11/32 239/690
2015/0273496 A1 * 10/2015 Shinoda ................ B05B 1/3405 118/631
2016/0199679 A1 * 7/2016 Kusu ...................... A62C 31/05 239/243
2022/0048051 A1 * 2/2022 Eggers .................. B05B 1/3405
2022/0080503 A1 * 3/2022 Shibayama ............... B05B 1/14

FOREIGN PATENT DOCUMENTS

EP 0516462 A1 * 12/1992 ............. B05B 5/032

* cited by examiner

*Primary Examiner* — Darren W Gorman
(74) *Attorney, Agent, or Firm* — Brozynski & Dalton, PC; Katarzyna Brozynski; Curtis Rew

(57) ABSTRACT

A paint nozzle may include a nozzle body defining a nozzle body axis. The nozzle body includes one or more sidewalls, an engagement upper surface and a dispensing lower surface. An internal nozzle chamber is formed between the upper and lower surfaces. A center dispensing channel connects the internal nozzle chamber to the dispensing lower surface and is parallel and coincident with the nozzle body axis. Two or more vortex dispensing channels are spaced axially outward from the center dispensing channel and are orientated at a dispensing angle relative to the nozzle body axis in order to generate a vortex flow around the center dispensing channel.

18 Claims, 7 Drawing Sheets

POWDER COATING NOZZLE

FIELD OF THE INVENTION

The present invention relates to a nozzle for a paint application system. In particular, the present invention relates to a paint nozzle for delivering powdered paint in a controlled vortex from a compact nozzle utilizing a triboelectric charge.

BACKGROUND OF THE INVENTION

The use of powder coating materials for the sealing and coloring of finishing surfaces is popular in many industrial and manufacturing processes. The use of powder coating materials can allow improved control over the application of paint to a surface. Furthermore, when combined with electrostatic process such as a triboelectric process, the powder coating is electrically attracted to the surface being coated allowing for an improved and consistent application. Powder coating has a longer lifespan than regular paint.

Although numerous approaches have been applied to powder coating, it becomes challenging when the paint is applied to small objects. Current powder coat head designs often require nozzles that are 8-12 inches long in order for rifling in the nozzle to create an adequate vortex of powder coating before it is expelled from the nozzle. This makes such designs impractical for use on small parts or other objects. Considerable amounts of powder coating can be lost to the surrounding air. It would be highly desirable to have a nozzle design that could impart a vortex or similar flow of powder coating while allowing the nozzle itself to be sized for paint application on smaller parts.

SUMMARY

Disclosed herein are implementations of a paint nozzle for use in the application of powder coating on small parts.

In one embodiment, the paint nozzle includes a nozzle body defining a nozzle body axis. The nozzle body includes one or more nozzle body sidewalls, a nozzle engagement upper surface, a nozzle dispensing lower surface and an internal nozzle chamber formed in between the upper and lower surfaces. A center dispensing channel connects the internal nozzle chamber to the dispensing lower surface to allow powder coating paint to be ejected from the paint nozzle. The center dispensing channel is orientated parallel and coincident with the nozzle body axis. Two or more vortex dispensing channels are spaced axially outward of the center dispensing channel and also connect the internal nozzle chamber to the dispensing lower surface to allow powder coating paint to be ejected from the paint nozzle. The two or more vortex dispensing channels are orientated at a dispensing angle relative to the nozzle body axis to generates a vortex flow of the powder coating around the center dispensing channel to improve application on a paint surface.

In one embodiment, the dispensing angle is 15 degrees relative to the nozzle body axis. In another, the dispensing angle may range from 7.5 degrees to 75 degrees relative to the nozzle body axis. In one embodiment each of the two or more vortex dispensing channels include a bevel formed on the nozzle dispensing lower surface to further improve the flow of the powder coating out of the paint nozzle. In one embodiment, the two or more vortex dispensing channels may comprise three vortex dispensing channels. In one embodiment, the two or more dispensing channels may be aligned to generate a counter clockwise vortex in the powder coating as it is ejected from the paint nozzle.

In one embodiment, the paint nozzle may be formed from a triboelectric material to impart an electrostatic charge to the powder coating prior to it being ejected from the paint nozzle. In one embodiment this is achieved through the use of virgin PTFE material to form the paint nozzle. In another embodiment, recycled PTFE may be utilized.

In one embodiment, it is contemplated that the paint nozzle comprises a cylindrical body with a diameter of less than 60 mm and preferably 28 mm. In one embodiment, the one or more nozzle sidewalls have a sidewall height of less than 60 mm and preferably 28 mm. In one embodiment, the nozzle engagements surface comprises a cylindrical engagement surface of less than 60 mm and preferably 32 mm.

In one embodiment, the internal nozzle chamber comprises a concave semi-spherical internal nozzle chamber. In one embodiment, the concave semi-spherical internal nozzle chamber has a diameter of less than 40 mm and preferably 22 mm. In one embodiment, the two or more vortex dispensing channels have a diameter of approximately 6 mm.

BRIEF DESCRIPTION OF THE DRAWINGS

In the detailed description presented below, reference will be made to the following drawings.

DETAILED DESCRIPTION

Referring now to FIGS. 1-4, which are exemplary illustrations of a paint nozzle 10 in accordance with an aspect of the current disclosure. The paint nozzle 10 is designed for the distribution of paint onto part surfaces. In one aspect, it is contemplated that the paint nozzle 10 is a powder coating paint nozzle for the application of powder coating paints.

Figure 1:
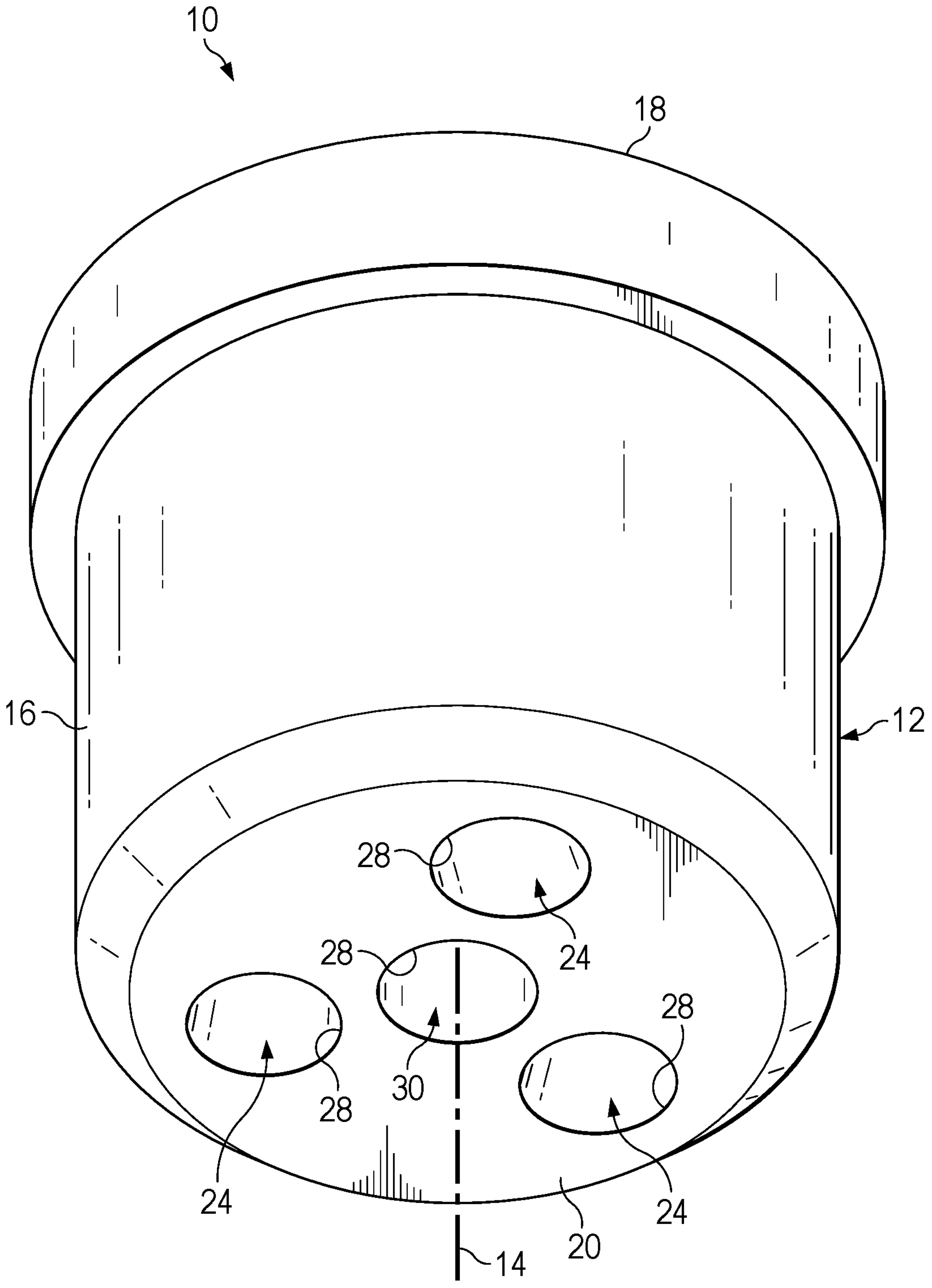
FIG. 1 illustrates a perspective view of an embodiment of the present disclosure, e.g., a paint nozzle.
Figure 2:
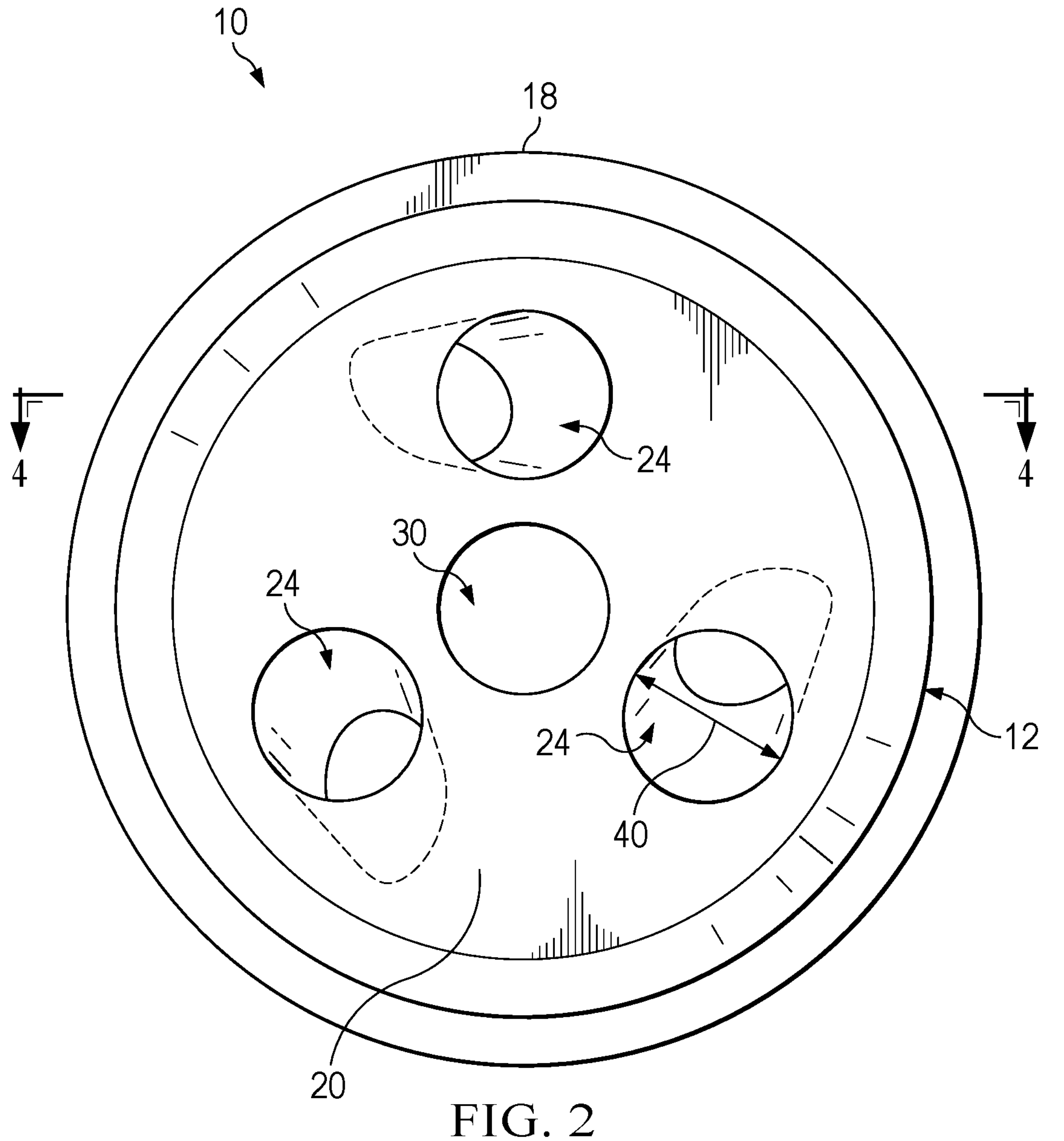
FIG. 2 is a top view of the paint nozzle illustrated in FIG. 1.
Figure 3:
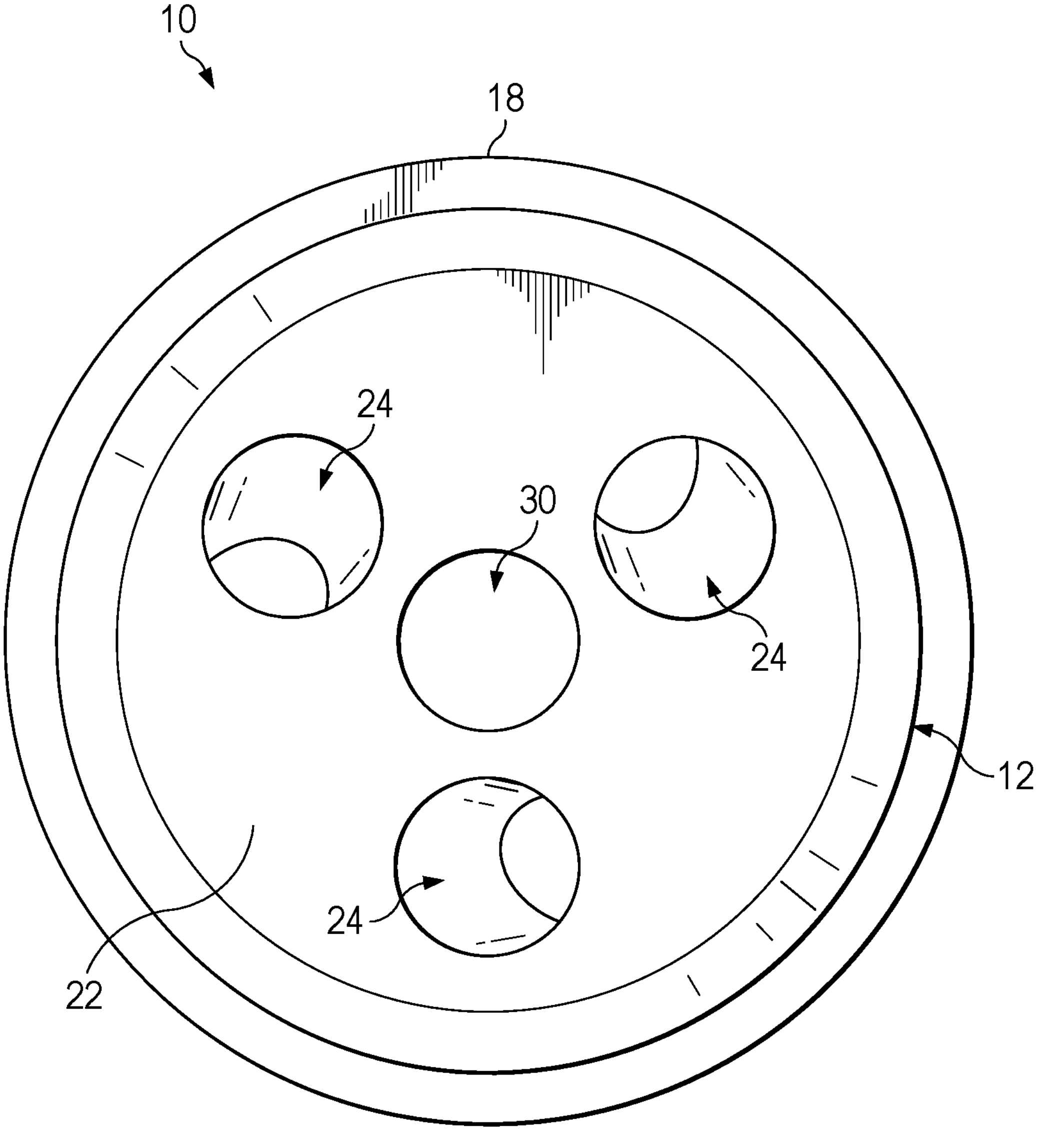
FIG. 3 is a bottom view of the paint nozzle illustrated in FIG. 1.
Figure 4:
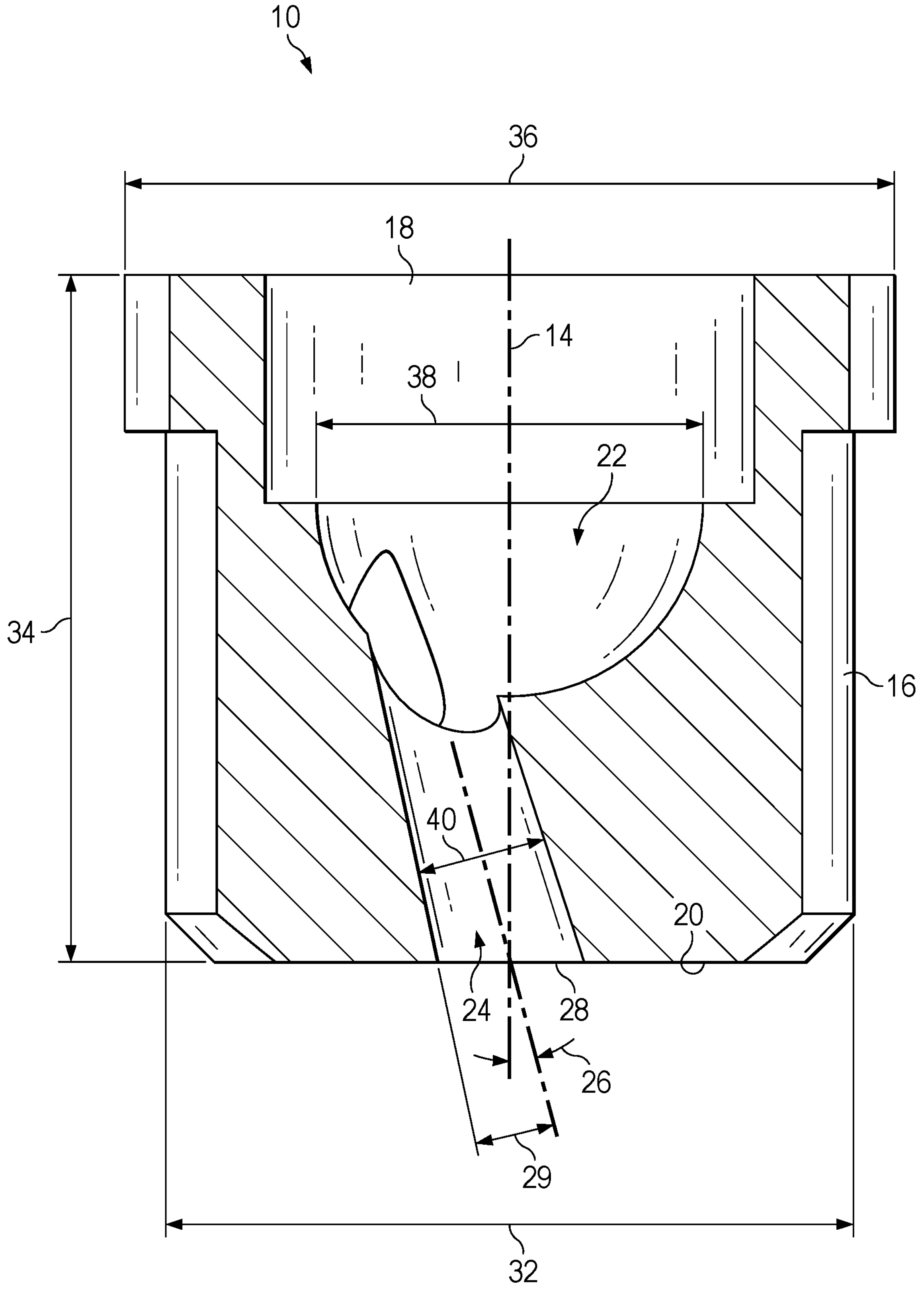
FIG. 4 is a cross-sectional view of the paint nozzle illustrated in FIG. 1.
Figure 5:
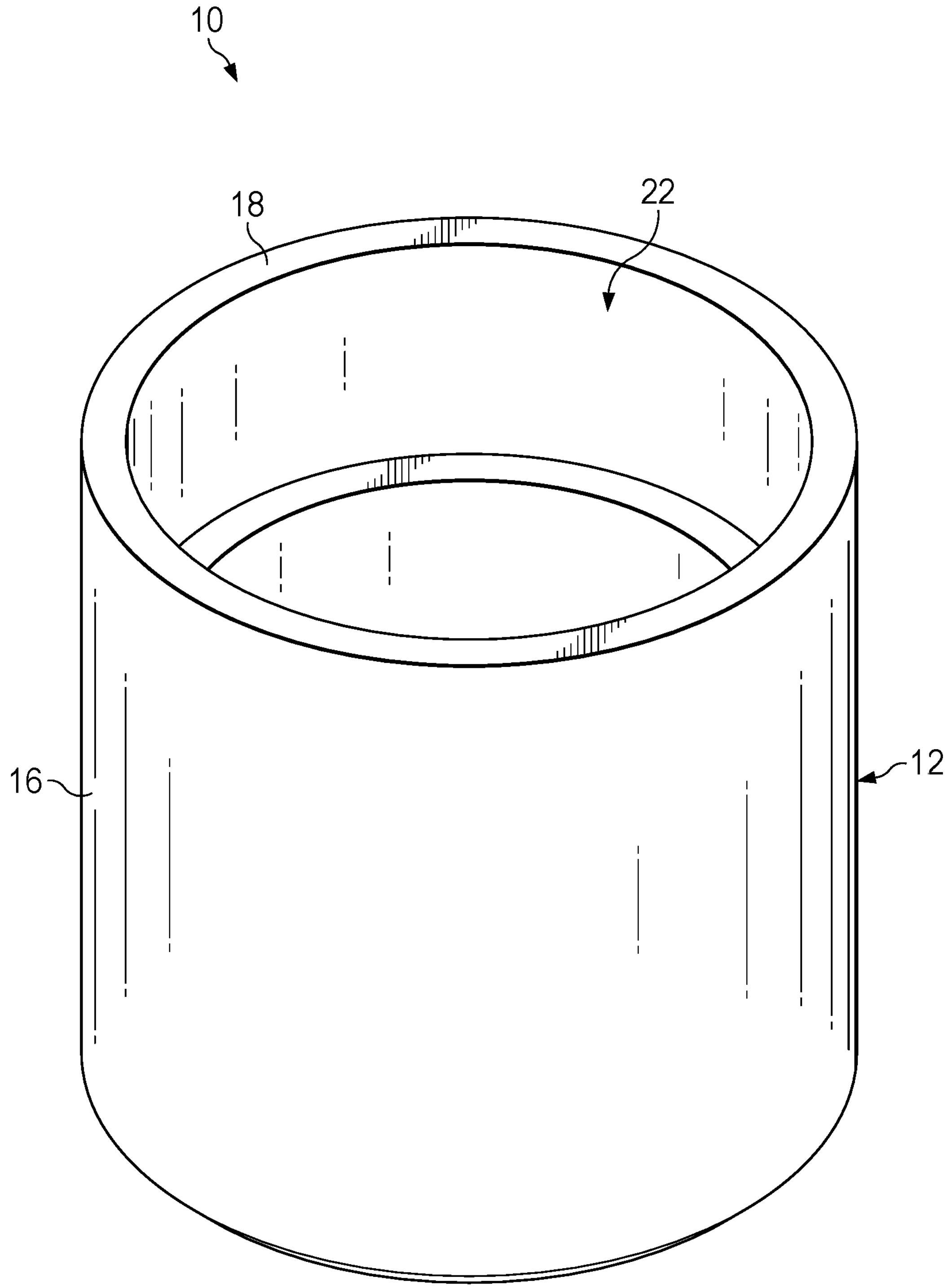
FIG. 5 illustrates an embodiment of the present disclosure, e.g., a paint nozzle.

The paint nozzle 10 includes a nozzle body 12 defining a nozzle body axis 14 (see FIG. 4). The nozzle body 12 may be formed in any suitable manufacturing process such as milling, casting, printing, molding, etc. Although a variety of different materials may be utilized to form the nozzle body 12, one aspect of the disclosure contemplates the use of triboelectric materials. Triboelectric materials impart an electric charge to materials passing through or past them. This is a significant advantage when utilized with powder coating paints. The electric charge imparted into the powder coating paints makes them attracted to the parts they are being applied to. This increases both the efficiency and well as the accuracy of the paint application. In one aspect, it is contemplated that virgin PTFE material may be utilized to form the nozzle body 12 as it operates efficiently as a triboelectric material. In another aspect, recycled PTFE may be utilized to form the nozzle body 12.

The nozzle body 12 may include one or more nozzle sidewalls 16. In the aspect shown in FIGS. 1-4, the nozzle body 12 is cylindrical and therefore has only a single sidewall 16. In other contemplated aspects, however, any suitable shape and corresponding number of sidewalls may be utilized. The nozzle body 12 may include a nozzle engagement upper surface 18. It is contemplated that the nozzle engagement upper surface 18 is configured to engage a paint gun or other application device. In one aspect, it is contemplated that the nozzle engagement upper surface 18 may be threaded or include other attachment features to securely attach to a paint gun or other application device. The nozzle body 12 also includes a nozzle dispensing lower surface 20. An internal nozzle chamber 22 is formed within the nozzle body 12 and is positioned between the nozzle engagement upper surface 18 and the nozzle dispensing lower surface 20. The internal nozzle chamber 22 allows the powder coating paint to mix within the nozzle body 12 and assists in imparting the electrical charge into the powder coating paint prior to application.

In one aspect of the disclosure, it is contemplated that the internal nozzle chamber 22 may be formed as a concave semi-spherical chamber. This shape of the internal nozzle chamber 22 improves mixing and charging of the powder coating. In one aspect, the nozzle body 12 may include two or more vortex dispensing channels 24 spaced radially outward of the nozzle body axis 14. In one aspect the two or more vortex dispensing channels 24 are contemplated to comprise three vortex dispensing channels 24. The two or more vortex dispensing channels 24 each connect the internal nozzle chamber 22 to the nozzle dispensing lower surface 20 to allow power coating paint to pass from the internal nozzle chamber 22 outward through the nozzle dispensing lower surface 20. Each of the two or more vortex dispensing channels 24 are orientated at a dispensing angle 26 relative to the nozzle body axis 14. In one aspect, each of the two or more vortex dispensing channels 24 have identical dispensing angles 26 and relative orientation around the nozzle body axis 14. This allows powder coating paint to generate a rotating vortex as it exits the nozzle dispensing lower surface 20. In one aspect of the disclosure, it is contemplated that the two or more vortex dispensing channels 24 are orientated to generate a counter-clockwise vortex in the powder coating paint as it exits the nozzle dispensing lower surface 20. In another aspect, a clockwise orientation is contemplated.

It is contemplated that a wide variety of dispensing angles 26 may be utilized. In one aspect, a dispensing angle 26 of approximately 15 degrees was found to be beneficial to paint application. In other aspects, dispensing angles 26 between 7.5 degrees and 75 degrees were contemplated. It is further contemplated that the dispensing angle 26 may be tailored to accommodate the desired width of a paint application surface, the desired output of paint, and/or the distance between the surface to be painted and the nozzle body 12. In another aspect, it is contemplated that each of the two or more vortex dispensing channels 24 may include a bevel 28 formed between the internal nozzle chamber and the nozzle dispensing lower surface 20. It is contemplated that the bevel 28 is defined by a bevel angle 29 relative to the direction of the dispensing channels 24. In one aspect, the bevel angle is less than 4 degrees. In another aspect, the bevel angle is 3 degrees. The addition of bevels 28 allows for an improved vortex generation in the dispersed powder coating paint.

Figure 6:
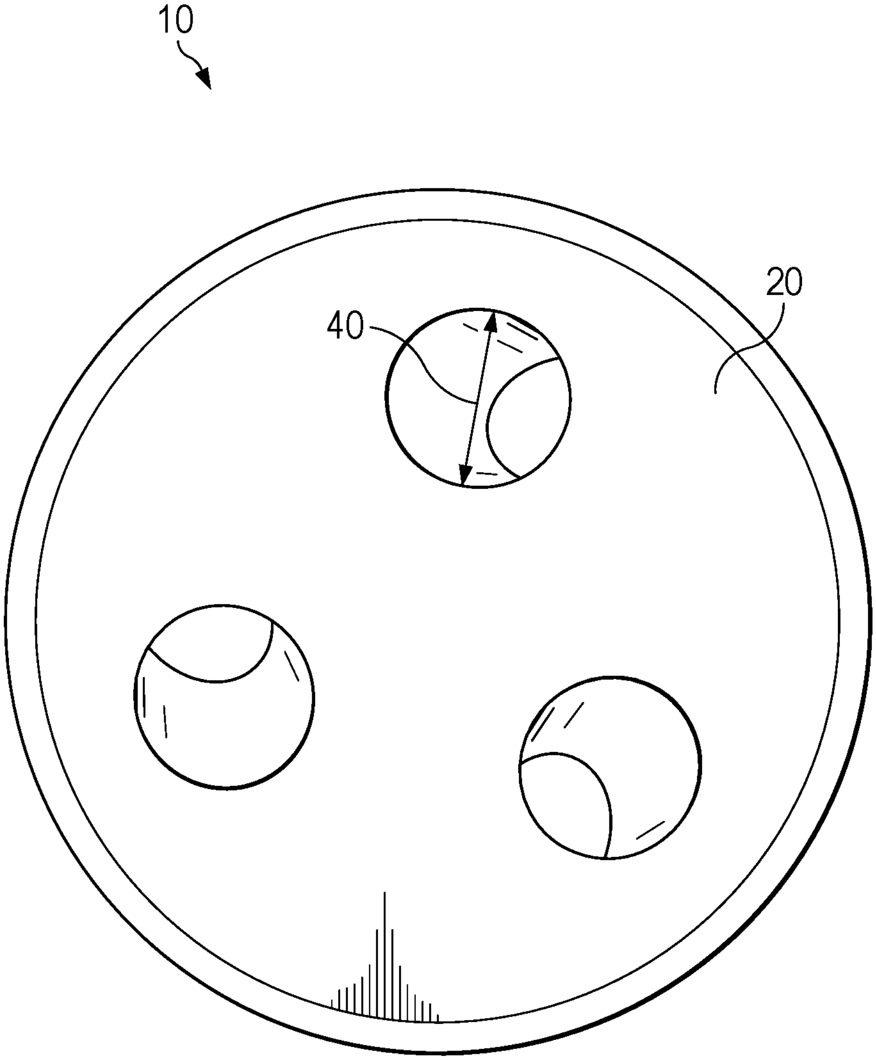
FIG. 6 is a bottom view illustration of the paint nozzle illustrated in FIG. 5.
Figure 7:
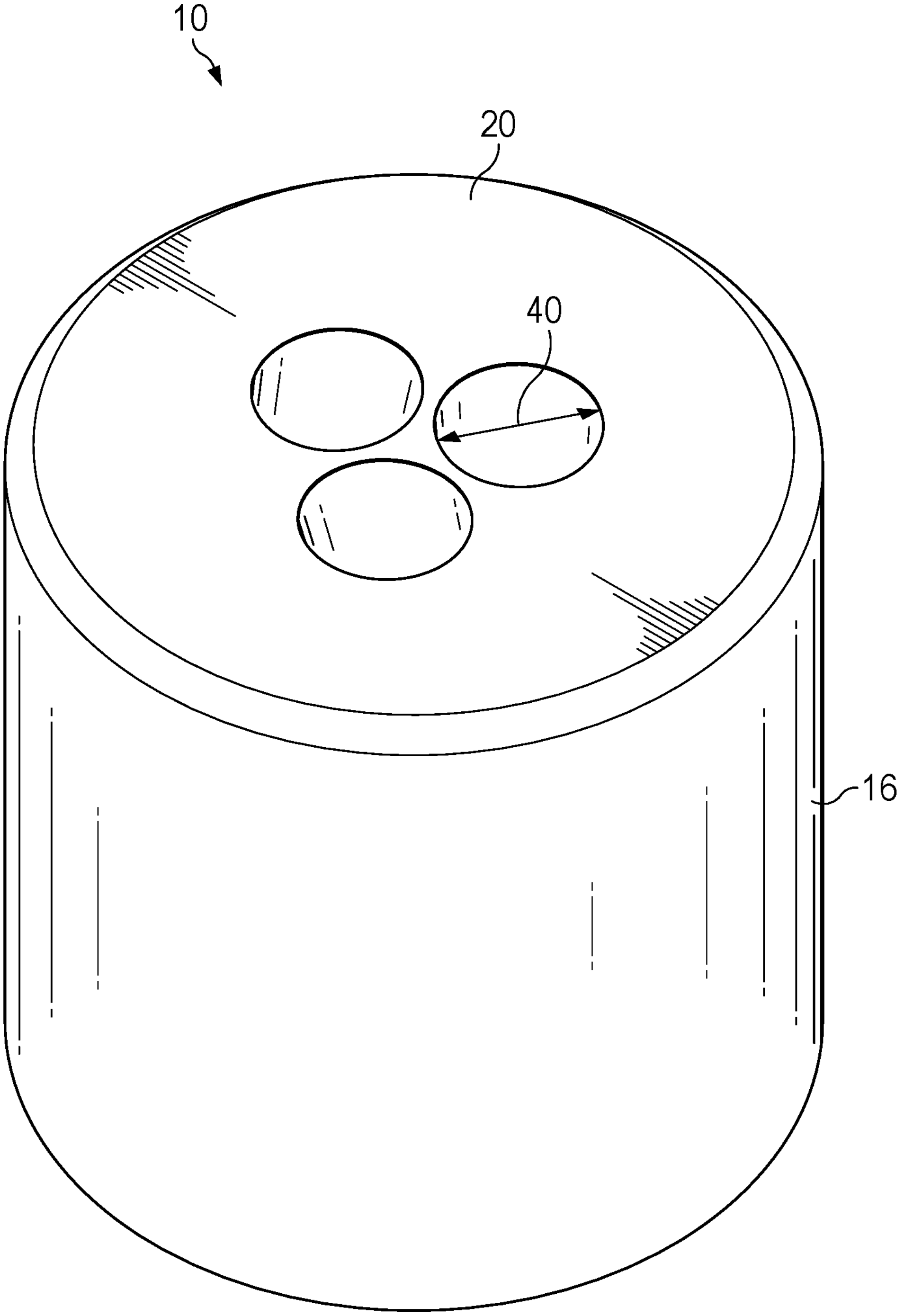
FIG. 7 illustrates an embodiment of the present disclosure, e.g., a paint nozzle.

In another aspect of the disclosure, the nozzle body 12 may include a center dispensing channel 30 connecting the internal nozzle chamber 22 to the nozzle dispensing lower surface 20 to allow power coating paint to pass from the internal nozzle chamber 22 outward through the nozzle dispensing lower surface 20. In one aspect, the center dispensing channel 30 is orientated parallel and coincident with the nozzle body axis 14. It is contemplated that the center dispensing channel 30 may include a bevel 28 formed at the nozzle dispensing lower surface 20. The center bevel 28 may have a bevel angle of less than 4 degrees. In another aspect, the center bevel 28 may have a bevel angle of 3 degrees. When used in conjunction with the two or more vortex dispensing channels 24, the center dispensing channel 30 provides a more concentrated paint application. In other aspects of the disclosure (FIGS. 6 and 7), the two or more vortex dispensing channels 24 may be utilized without the center dispensing channel 30.

The present disclosure describes a paint nozzle 10 that can generate a vortex paint spray in a small, concentrated package. This allows it to be utilized on small parts and in smaller applications that conventional rifling induced spray nozzles may be unsuitable for. In one aspect of the disclosure, it is contemplated that the nozzle body 12 comprises a cylindrical body with a diameter less than 60 mm. In another aspect of the disclosure, it is contemplated that the nozzle body 12 comprises a cylindrical body with a body diameter 32 of approximately 28 mm. Similarly, in one aspect of the disclosure it is contemplated that the nozzle body sidewalls 16 may compromise a sidewall height 34 of less than 60 mm. In another aspect of the disclosure, it is contemplated that the sidewall height is approximately 28 mm. In another aspect of the disclosure, the nozzle engagement upper surface 18 is contemplated to be a cylindrical nozzle engagement upper surface 18 with an upper surface diameter 36 less than 60 mm. In another aspect of the disclosure, it is contemplated that the upper surface diameter 36 is approximately 32 mm. Similarly, in one aspect of the disclosure the internal nozzle chamber 22 may be formed as a concave semi-spherical chamber having a spherical diameter 38 of less than 40 mm. In another aspect of the disclosure, it is contemplated that the spherical diameter 38 is approximately 22 mm. Additionally, each of the two or more vortex dispensing channels 24 and the center dispensing channel 30 may comprise a channel diameter 40. It is contemplated that the channel diameter is less than 15 mm and in one aspect is 6 mm.

This disclosure is an improvement to the nozzles used in the "guns" that are used for this powder coating process. The disclosure describes a nozzle of compact design that creates a vortex in the powder to allow greater electrostatic charge over existing systems. Current powder coat head designs might require large and long nozzles which are not ideal in certain manufacturing environments. This disclosure describes a paint nozzle 10 that provides more efficient powder coating by way of vortex creation that results in more powder being deposited on the target and less powder wasted in the air. Testing indicated a possible 20-30% reduction in the amount of powder needed to achieve adequate coating of a product. It is contemplated that the described paint nozzle 10 is suitable for stationary or hand-held paint gun systems.

Any portion of the systems, apparatuses, methods, and processes herein may occur in any order or sequence. Certain components or steps may occur simultaneously, others may be added, and/or others may be omitted. This disclosure is provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. The embodiments of this disclosure are capable of modification and variation.

All terms used in the claims are intended to be given their broadest reasonable constructions and their ordinary meanings as understood by those knowledgeable in the technologies described herein unless an explicit indication to the contrary is made herein. Use of the singular articles such as "a," "the," "said," etc. should be read to recite one or more of the indicated elements unless a claim recites an explicit limitation to the contrary.

The Abstract of the Disclosure is provided to allow the reader to ascertain the nature of the technical disclosure, but it should not be used to interpret or limit the scope or meaning of the claims. Various features of this disclosure may be grouped together in various embodiments for the purpose of streamlining the disclosure, but the claimed embodiments shall not be interpreted as requiring more features than are expressly recited in each claim. The inventive subject matter of the claims lies in less than all features of a single disclosed embodiment. Thus, the following claims are hereby incorporated into the Detailed Description, with each claim standing on its own as a separately claimed subject matter.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A paint nozzle comprising:

a nozzle body defining a nozzle body axis, the nozzle body including one or more nozzle sidewalls, a nozzle engagement upper surface, a nozzle dispensing lower surface, and an internal nozzle chamber formed in between the nozzle dispensing lower surface and the nozzle engagement upper surface;

a center dispensing channel connecting the internal nozzle chamber to the nozzle dispensing lower surface, the center dispensing channel orientated parallel and coincident with the nozzle body axis;

two or more vortex dispensing channels spaced radially outward from the center dispensing channel, each of the two or more vortex dispensing channels connecting the internal nozzle chamber to the nozzle dispensing lower surface, the two or more vortex dispensing channels orientated at a dispensing angle relative to the nozzle body axis.

2. The paint nozzle of claim 1, wherein the dispensing angle is 15 degrees relative to the nozzle body axis.

3. The paint nozzle of claim 1, wherein the dispensing angle is between 7.5 degrees and 75 degrees.

4. The paint nozzle of claim 1, wherein each of the two or more vortex dispensing channels includes an exit bevel formed between the internal nozzle chamber and the nozzle dispensing lower surface.

5. The paint nozzle of claim 1, wherein the nozzle body comprises a triboelectric material.

6. The paint nozzle of claim 5, wherein the nozzle body comprises one of virgin PTFE and recycled PTFE.

7. The paint nozzle of claim 1, wherein the two or more vortex dispensing channels comprise three vortex dispensing channels.

8. The paint nozzle of claim 1, wherein the nozzle body comprises a cylindrical body with a diameter of approximately 28 mm.

9. The paint nozzle of claim 1, wherein the one or more nozzle sidewalls have a sidewall height of approximately 28 mm.

10. The paint nozzle of claim 1, wherein the nozzle engagement surface comprises a cylindrical engagement surface with a diameter of approximately 32 mm diameter.

11. The paint nozzle of claim 1, wherein the two or more vortex dispensing channels are orientated to generate a vortex in a counterclockwise direction.

12. The paint nozzle of claim 1, wherein the internal nozzle chamber comprises a concave semi-spherical internal nozzle chamber.

13. The paint nozzle of claim 12, wherein the concave semi-spherical internal nozzle chamber comprises a spherical diameter of approximately 22 mm.

14. A powder coating paint nozzle comprising:

a nozzle body defining a nozzle body axis, the nozzle body including one or more nozzle sidewalls, a nozzle engagement upper surface, a nozzle dispensing lower surface, and an internal nozzle chamber formed in between the nozzle dispensing lower surface and the nozzle engagement upper surface; and two or more vortex dispensing channels spaced radially outward from the nozzle body axis, each of the two or more vortex dispensing channels connecting the internal nozzle chamber to the nozzle dispensing lower surface, the two or more vortex dispensing channels orientated at a dispensing angle relative to the nozzle body axis, each of the two or more vortex dispensing channels including an exit bevel formed between the internal nozzle chamber and the nozzle dispensing lower surface.

15. The powder coating paint nozzle of claim 14, wherein the exit bevel has a bevel angle of less than four degrees.

16. The powder coating paint nozzle of claim 14, wherein the exit bevel has a bevel angle of approximately three degrees.

17. The powder coating paint nozzle of claim 14, wherein the nozzle body comprises a cylindrical body with a diameter less than 60 mm.

18. The powder coating paint nozzle of claim 14, wherein the internal nozzle chamber comprises a concave semi-spherical internal nozzle chamber having a spherical diameter of less than 30 mm.

* * * * *